United States Patent
Geri et al.

(10) Patent No.: US 11,144,469 B2
(45) Date of Patent: Oct. 12, 2021

(54) PER-TENANT INCREMENTAL OUTWARD DISTRIBUTED PROACTIVE CACHING

(71) Applicant: Microsoft Technology Licensing, LLC, Redmond, WA (US)

(72) Inventors: Amir Geri, Modi'in (IL); Asher Budik, Rosh-Haayin (IL); Daniel Senderovich, Netanya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 16/459,863

(22) Filed: Jul. 2, 2019

(65) Prior Publication Data

US 2021/0004332 A1    Jan. 7, 2021

(51) Int. Cl.
*G06F 12/0891* (2016.01)
*G06F 12/0815* (2016.01)
*G06F 12/1081* (2016.01)
*G06F 16/9035* (2019.01)

(52) U.S. Cl.
CPC ...... *G06F 12/0891* (2013.01); *G06F 12/0815* (2013.01); *G06F 12/1081* (2013.01); *G06F 16/9035* (2019.01); *G06F 2212/1021* (2013.01); *G06F 2212/1024* (2013.01)

(58) Field of Classification Search
CPC ............. G06F 12/0891; G06F 12/0815; G06F 16/9035; G06F 12/1081; G06F 2212/1024; G06F 2212/1021; G06F 12/123
See application file for complete search history.

(56) References Cited

U.S. PATENT DOCUMENTS

| | | | |
|---|---|---|---|
| 6,654,766 B1 * | 11/2003 | Degenaro | G06F 12/123 |
| 2011/0191541 A1 * | 8/2011 | Lowry | G06F 12/0815 |
| | | | 711/119 |
| 2014/0112339 A1 * | 4/2014 | Safranek | G06F 8/71 |
| | | | 370/389 |
| 2017/0310715 A1 | 10/2017 | Budik et al. | |

(Continued)

OTHER PUBLICATIONS

"Zscaler Cloud Security Solution for ISPs", retrieved from <<https://www.zscaler.com/partners/zscaler-for-isps>>, 5 pages, no later than May 16, 2019.

(Continued)

*Primary Examiner* — Michelle T Bechtold
(74) *Attorney, Agent, or Firm* — Ogilvie Law Firm

(57) ABSTRACT

Distributed computing system functionality is enhanced. Transmission of data changes may be incremental, thus reducing bandwidth usage and latency. Data changes may be propagated over geographic distances in an outward-only manner from a central data store to one or more servers or other remote nodes, using proactive updates as opposed to making cache updates only in reaction to cache misses. Cache expiration and eviction may be reduced or avoided as mechanisms for determining when cached data is modified. A central computing environment may proactively push incremental data entity changes to place them in remote data stores. Remote nodes proactively check their remote data store, find changes, pull respective selected changes into their remote node caches, and provide current data in response to service requests. Data may be owned by particular tenants. Data pulls may be limited to data in selected categories, data of recently active tenants, or both.

20 Claims, 6 Drawing Sheets

(56) References Cited

U.S. PATENT DOCUMENTS

| | | |
|---|---|---|
| 2017/0331864 A1 | 11/2017 | Budik et al. |
| 2018/0205765 A1 | 7/2018 | Budik et al. |
| 2018/0205766 A1 | 7/2018 | Budik et al. |

OTHER PUBLICATIONS

"Connect Offices to Each Other and the Internet Securely with Microsoft Virtual WAN", retrieved from <<https://www.iboss.com/solution-briefs/microsoft-virtual-wan/>>, 12 pages, no later than May 16, 2019.

"Symantec Web Security Service", retrieved from <<https://www.symantec.com/content/dam/symantec/docs/data-sheets/web-security-service-at-a-glance-en.pdf>>, 4 pages, copyright 2018.

"Protect apps with Microsoft Cloud App Security Conditional Access App Control", retrieved from <<https://docs.microsoft.com/en-us/cloud-app-security/proxy-intro-aad>>, 6 pages, Jan. 28, 2019.

James Gwertzman and Margo Seltzer, "An Analysis of Geographical Push-Caching", retrieved from <<https://pdfs.semanticscholar.org/e014/9cda629611e6ed6ed27563f47683a6d14e67.pdf>>, 20 pages, no later than May 10, 2019.

"Content delivery network", retrieved from <<https://en.wikipedia.org/wiki/Content_delivery_network>>, 7 pages, Apr. 29, 2019.

"Cache hierarchy", retrieved from <<https://en.wikipedia.org/wiki/Cache_hierarchy>>, 8 pages, Nov. 21, 2018.

"Edge computing", retrieved from <<https://en.wikipedia.org/wiki/Edge_computing>>, 3 pages, May 9, 2019.

"Cache replacement policies", retrieved from <<https://en.wikipedia.org/wiki/Cache_replacement_policies>>, 9 pages, May 16, 2019.

"Cache (computing)", retrieved from <<https://en.wikipedia.org/wiki/Cache_(computing)>>, 8 pages, May 22, 2019.

"Network address translation", retrieved from <<https://en.wikipedia.org/wiki/Network_address_translation>>, 15 pages, May 19, 2019.

"Latency (engineering)", retrieved from <<https://en.wikipedia.org/wiki/Latency_(engineering)>>, 3 pages, May 19, 2019.

\* cited by examiner

_(US 11,144,469 B2)_

PER-TENANT INCREMENTAL OUTWARD DISTRIBUTED PROACTIVE CACHING

BACKGROUND

Noon A familiar approach to caching stores data so that future requests for that data can be satisfied faster. The cached data is kept in cache entries. A cache hit occurs when the requested data is found in a cache, and a cache miss occurs when the data is not found in the cache. After a miss, the requested data is recomputed and put in the cache, or is fetched from other data storage and put in the cache. Often an existing cache entry is removed (evicted from the cache) in order to make room for the newly retrieved or recomputed data.

Cache hits tend to improve system performance by rapidly providing the requested data to the requestor straight from the cache, which is faster than recomputing the data or reading the data from slower data storage. To increase the likelihood of hits, cache entries may be forced to expire and may be evicted if they have not been used recently. For example, under a least recently used (LRU) replacement policy, when the cache is updated with new data after a miss, to make room for the new data the cache replaces the oldest entry, namely, the cache entry that was accessed less recently than any other entry. The new data takes the place of the older data, which is thereby evicted.

SUMMARY

Some embodiments use or perform operations that enhance a distributed computing system with functionality that reduces latency. Technical characteristics of the enhanced distributed computing system or its operations in a given embodiment may include one or more of the following: transmission of changes in incremental rather than block form (thus reducing bandwidth usage and latency), propagation of changes in an outward-only manner from a central data store to one or more remote servers, proactive updates as opposed to reactive updates (e.g., updates made in reaction to cache misses), or avoidance of cache expiration and cache eviction as mechanisms for determining when a cache is modified. Other technical characteristics and technical functionalities are also described herein.

Some embodiments of teachings presented herein include or communicate with data provisioning functionality that includes digital hardware that is configured to perform certain operations. These operations may include (a) receiving from a central computing environment a proactively pushed incremental change to a data entity that is owned by a tenant, (b) placing the incremental change in a remote data store of a remote computing system, (c) proactively checking the remote data store for tenant data updates, (d) finding the incremental change in the remote data store, (e) determining that the incremental change has not yet been pulled onto a remote server of the remote computing system, (f) pulling the incremental change onto the remote server, (g) applying the incremental change to produce an updated copy of the data entity in the cache, and (h) providing tenant data of the updated copy of the data entity in response to a request to the remote server for current tenant data.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
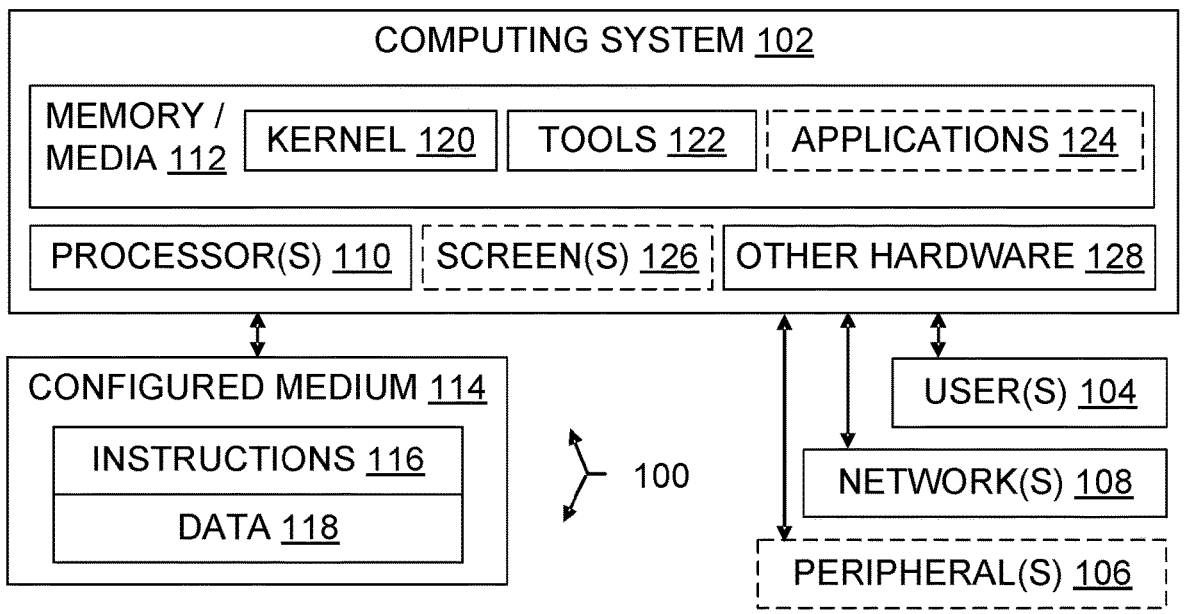
FIG. 1 is a block diagram illustrating computer systems generally and also illustrating configured storage media generally.
Figure 2:
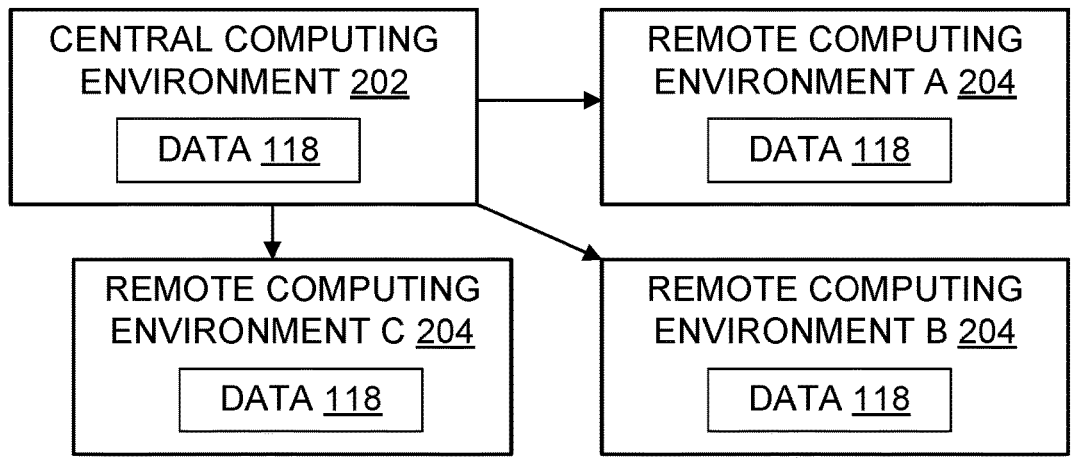
FIG. 2 is a block diagram illustrating a central computing environment and several remote computing environments, which collectively form a distributed computing system.
Figure 3:
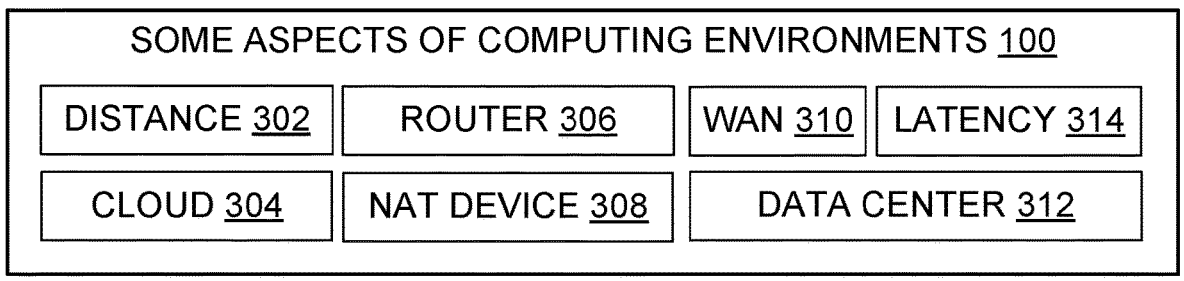
FIG. 3 is a block diagram illustrating some aspects of some computing environments.

Many innovations expand beyond their origins, but understanding an innovation's origins can help one more fully appreciate the innovation. In the present case, some teachings described herein were motivated by technical challenges of reducing the latency of serving digital documents in a global system. The global system includes servers in the United States, Europe, Japan, Brazil, and other locations, with thousands of tenants and millions of users. Documents loaded into the system by a tenant admin are to be distributed to appropriate users at widely separated locations. In some test cases, 95% of documents were delivered in under a minute, and with particular functionality enhancements described herein delivery times have been reduced so that 95% of certain documents are stored in a specialized cache at remote servers within less than thirty seconds.

In a conventional multilayer caching system, data is organized in blocks. These conventional blocks are low resolution relative to data updates, in the sense that it is not unusual for half or more of the data in such a block to be unchanged even when the block does contain an update to cached data. Some conventional multilayer caching systems also reactively load data into layers closer to a destination, subject to various eviction policies.

By contrast, some embodiments described herein proactively push incremental updates from a data center or other central computing environment to a local region. In the local region, one or more nodes (e.g., servers or clusters) examine changes at a high resolution (e.g., less than 10% old data per change transmission) to determine which parts of a local block of data actually need to be refreshed. Then the local region node pulls in the refresh without relying on cache eviction to determine when the local node's cached data is updated.

Note that although the preceding paragraph speaks of "local" nodes and regions, that terminology assumes a particular reference point of view. The server node is local, in this view, while the central computing environment is remote from the server node. One can also take the central computing environment as a reference point, such that the node pulling in incremental updates is viewed as a remote node. In general, the latter viewpoint is utilized in the present document, but one of skill will understand that "local" and "remote" are merely convenient labels and do not inherently constrain functionality.

In contrast with some conventional proxy systems, some embodiments described herein do not condition cache updates on user requests for data. Some embodiments also do not forward user requests, as a proxy would. Differences from other conventional technologies will also become apparent to one of skill.

Some embodiments described herein may be viewed by some people in a broader context. For instance, concepts such as caching, change, distance, eviction, expiration, latency, pulling versus pushing, and selection may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently provision data from a central data store to distant servers. Other configured storage media, systems, and processes involving caching, change, distance, eviction, expiration, latency, pulling versus pushing, or selection are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular environments, software processes, identifiers, files, data structures, notations, control flows, protocols, naming conventions, or other implementation or notational choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as reducing latency in the provisioning of digital data, updating data which is stored in a cache memory, and communicating between various components in a distributed computing system, which are each activities deeply rooted in computing technology. Some of the technical mechanisms discussed include, e.g., incremental change communications, data categories, data entities, a data replicator, data stores, and timestamps. Some of the technical effects discussed include, e.g., cache updates without reliance on eviction or expiration, outward-only flow of updates, reduced latency, and other aspects of data provisioning. Thus, purely mental processes are clearly excluded. Some embodiments improve the functioning of computing systems by meeting a specified performance level in terms of cache hits or in terms of checking for data updates, or both. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTTP: hypertext transfer protocol
HTTPS: hypertext transfer protocol secure
IaaS or IAAS: infrastructure-as-a-service
ID: identification or identity
IoT: internet of things
IP: internet protocol
LAN: local area network
LRU: least recently used
NAT: network address translation
NIC: network interface card
OS: operating system
PaaS or PAAS: platform-as-a-service
RAM: random access memory
ROM: read only memory
UEFI: Unified Extensible Firmware Interface
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text.

The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization.

A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Timestamp" means any numeric value(s) that can be used to determine the recentness of one piece of data relative to another piece of data. In particular, a timestamp need not correlate with the system time or the CPU cycles of a given system, and a timestamp need not correlate with wall clock time.

The terms "node" and "service node" and "remote server" are used interchangeably herein, with the broader meaning of "node" (a single server, or a set of coordinated servers, or a cluster, or a network endpoint) applying to each term.

As used herein, "central" means "primary" or "interior" when used in discussion of a central computing environment or a central data store, as opposed to meaning "at or near a central location" in terms of physical geography or network topology.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as automatically receiving pushed incremental changes (which is understood to occur electronically), placing an incremental change in a memory (which is understood to be a digital memory), checking a remote data store (which is understood to store digital data) for changes, comparing timestamps, pulling a change onto a remote server 102, applying a change to cached data 118, and many other operations discussed, are understood herein as inherently digital. A human mind cannot interface directly with a CPU or NIC or other processor, or with RAM or other digital storage, to read and write the necessary data to perform the data provisioning steps taught herein. This would all be well understood by persons of skill in the art in view of the present disclosure, but others may sometimes need to be informed or reminded of the facts.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required.

However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as applying, ascertaining, checking, communicating, comparing, defining, detecting, determining, evicting, expiring, finding, getting, maintaining, meeting, placing, producing, providing, provisioning, pulling, pushing, receiving, refreshing, removing, requesting, residing, satisfying, selecting, sending (and applies, applied, ascertains, ascertained, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

Figure 5:
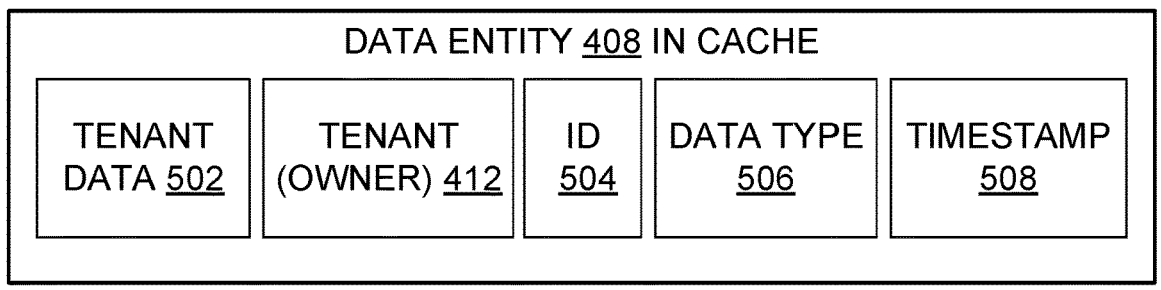
FIG. 5 is a block diagram illustrating some aspects of a data entity.
Figure 6:
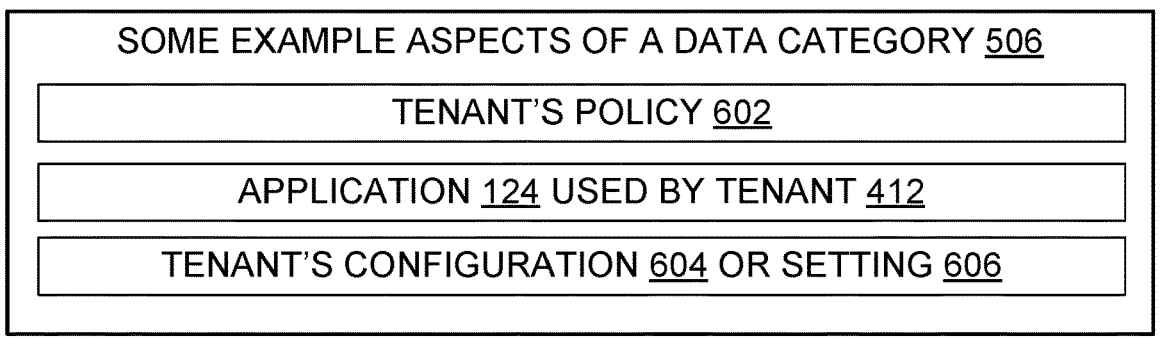
FIG. 6 is a block diagram illustrating some aspects of a data category.
Figure 7:
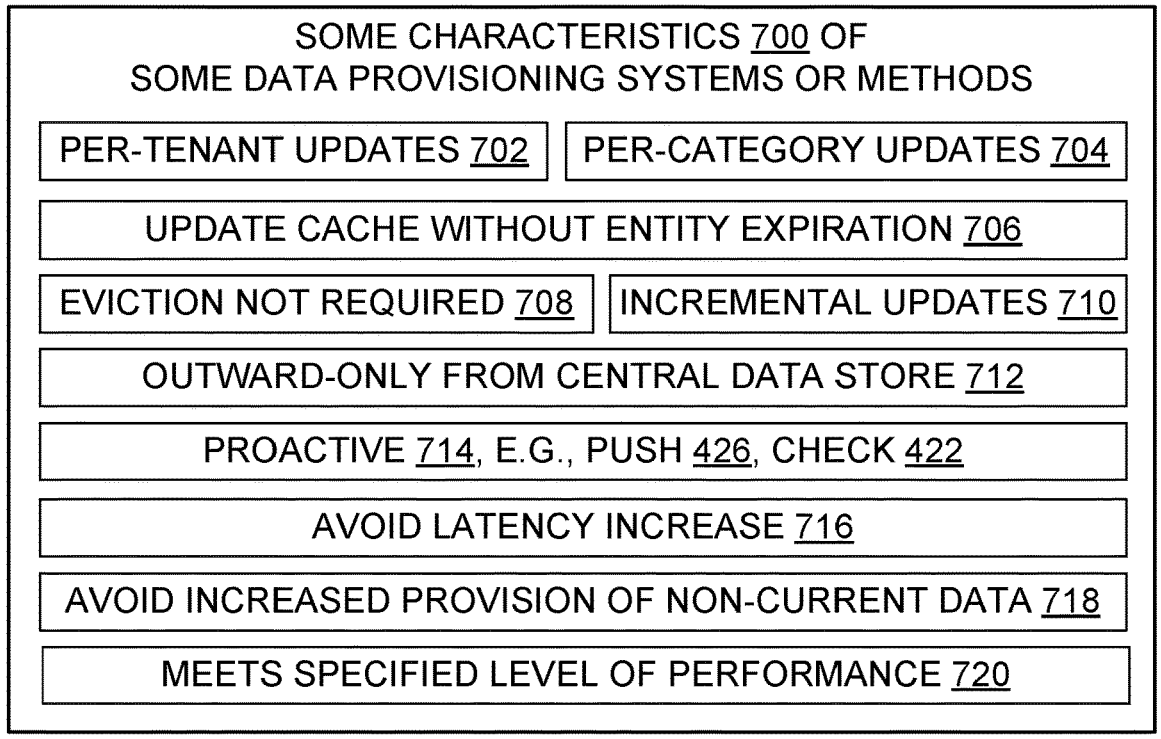
FIG. 7 is a block diagram illustrating some technical characteristics of some data provisioning systems or some data provisioning methods or both.
Figure 8:
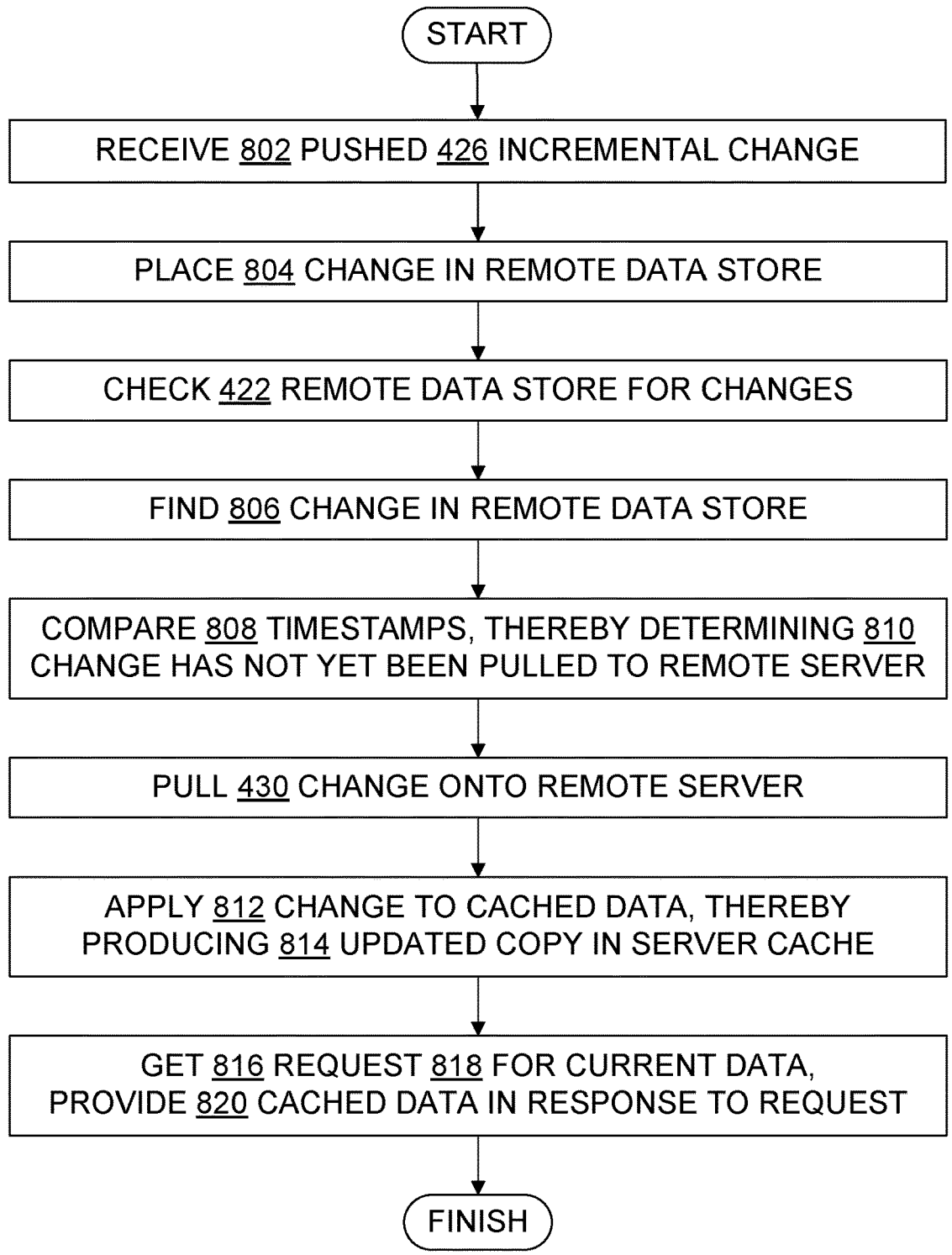
FIG. 8 is a flowchart illustrating steps in some data provisioning methods from a remote computing system perspective.
Figure 9:
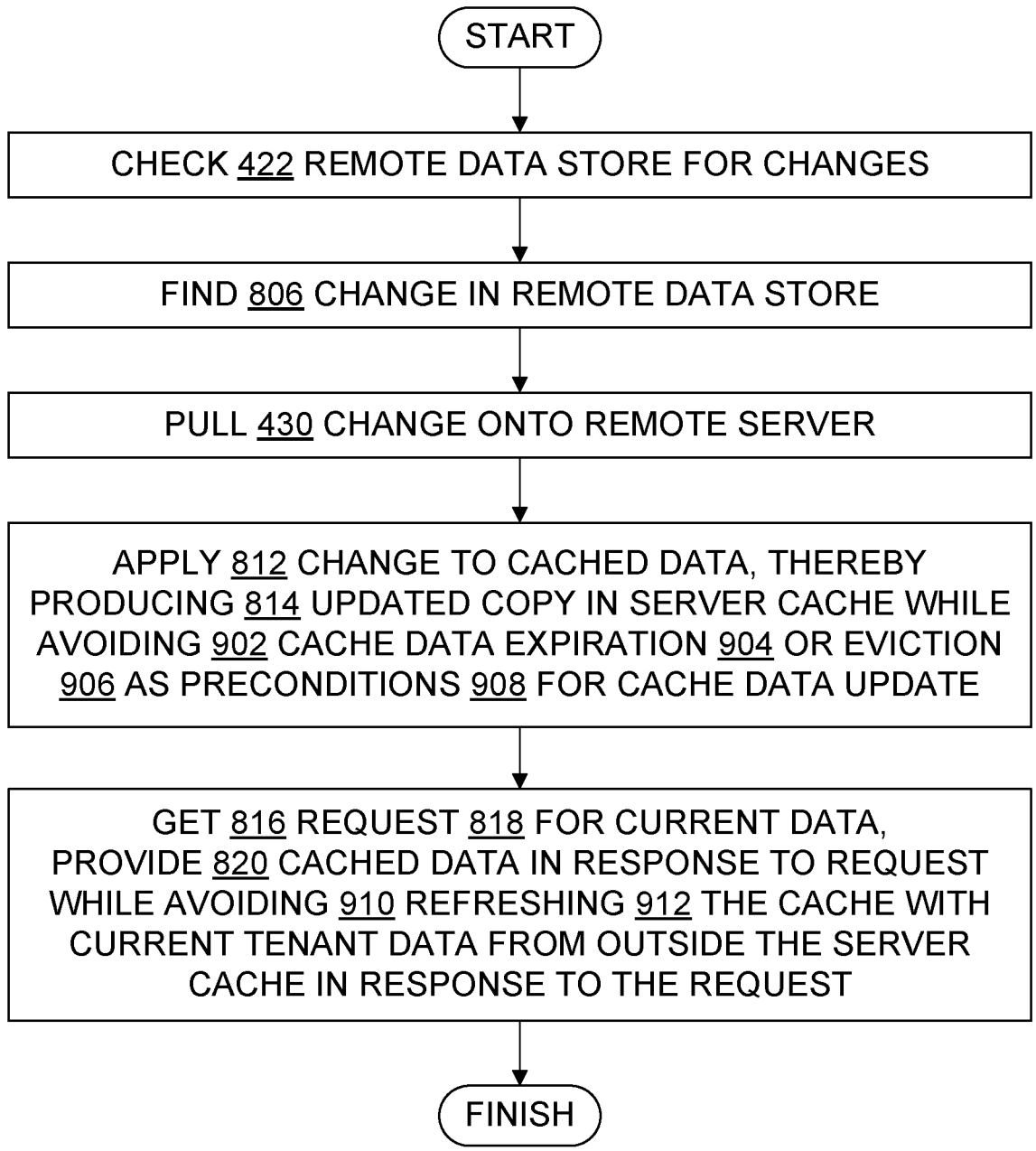
FIG. 9 is a flowchart illustrating steps in some data provisioning methods from a remote server perspective.
Figure 10:
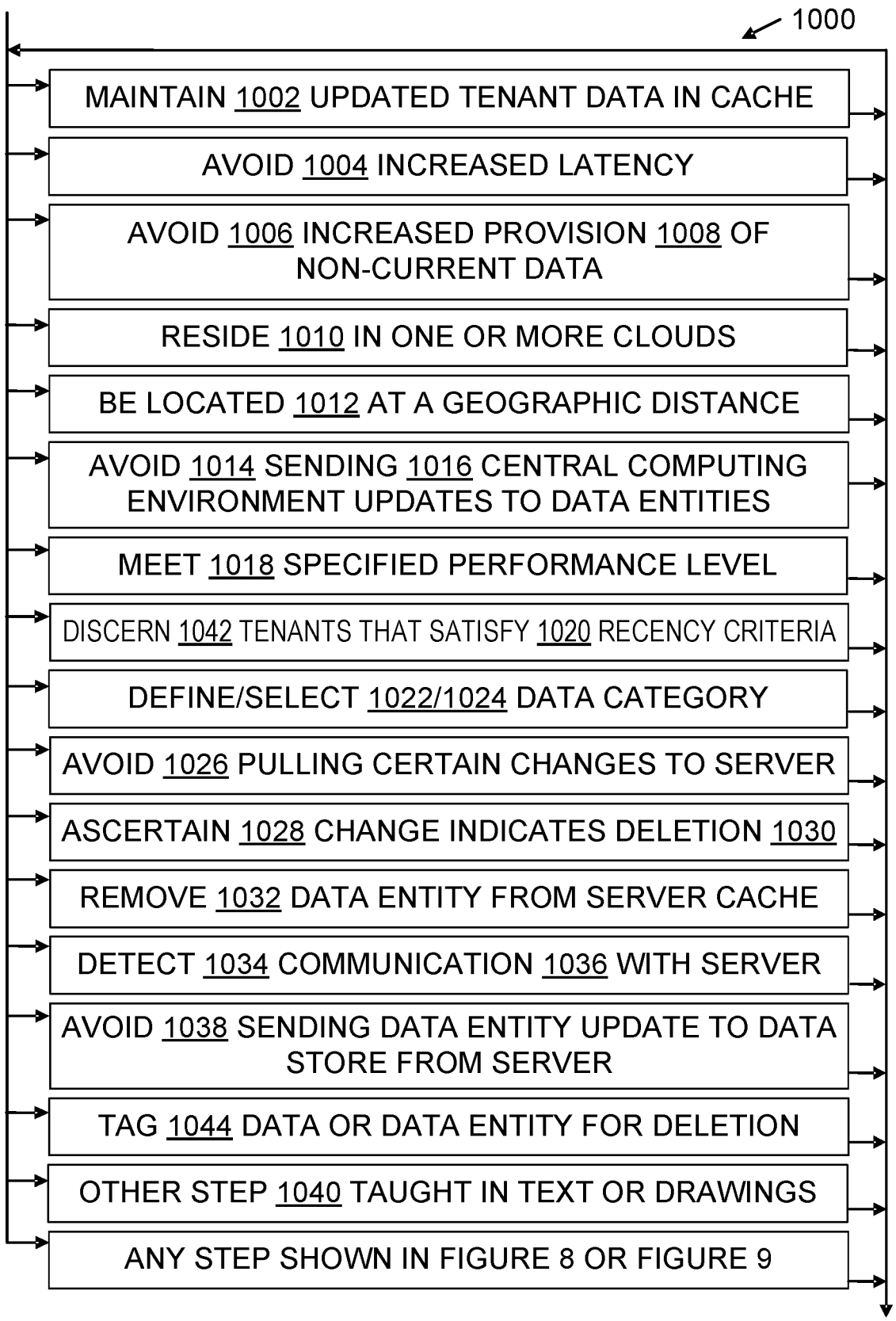
FIG. 10 is a flowchart further illustrating steps in some data provisioning methods.

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data generally
120 kernel(s), e.g., operating system(s), BIOS, UEFI, device drivers
122 tools, e.g., anti-virus software, firewalls, packet sniffer software, intrusion detection systems, intrusion prevention systems, debuggers, profilers, compilers, interpreters, decompilers, assemblers, disassemblers, source code editors, simulators, fuzzers, repository access tools, version control tools, optimizers, collaboration tools, software development tools and tool suites, hardware development tools and tool suites, diagnostics, and so on
124 applications, e.g., word processors, web browsers, spreadsheets, games, email tools
126 display screens, also referred to as "displays"
128 computing hardware not otherwise associated with a reference number 106, 108, 110, 112, 114
202 central computing environment, namely, the one from which data updates propagate outward
204 remote computing environment
302 distance between computing systems or computing environments; may be a physical distance or a network distance; measured from the effective center of a system or environment, e.g., from a central data store to a remote data store, or from a remote data store to a remote node
304 cloud; may also be referred to as "cloud computing environment"
306 router or gateway; may be a virtual or a physical device or appliance; may perform functions in addition to routing
308 NAT device, i.e., a device that performs network address translation; may be a virtual or a physical device or appliance; may perform functions in addition to NAT
310 wide area network
312 data center
314 latency
400 distributed computing system
402 data store generally
404 central data store
406 remote data store
408 data entity, e.g., document, record, log, patch, code, file, or other digital artifact, enhanced with metadata such as an ID 504, timestamp 508, category 506, or owner ID 412
410 data replicator
412 tenant, e.g., cloud tenant, network tenant; also refers to tenant ID
414 remote node, e.g., node which is in a remote computing environment at a geographic distance from the central data store 416 server
418 cache configured for operation as described herein, e.g., without reliance on eviction and expiration to determine when cached data is updated;
418 may also refer to the act of caching, i.e., placing data in a cache
420 tenant's administrative portal
422 listen for changes to a data entity; also refers to act of checking for changes or polling for changes or awaiting interrupt triggered by change
424 add or otherwise update a timestamp
426 push a change to data, that is, transmit the change proactively from the current actor or component or location to another actor or component or location
428 a change to data; may be a change in value or a deletion request or command, for example
430 pull a change to data, that is, transmit the change proactively from another actor or component or location to the current actor or component or location
502 tenant data or other data 118 whose efficient provisioning is a user-driven goal of the data provisioning functionality
504 document identifier; may also refer to an identification of a data entity
506 data type in a broader sense of what kind of data as opposed to a narrow sense of integer, float, Boolean, etc.; also referred to as "data category"; numeral 506 may also refer to an identification of a particular data category or particular set of data categories
508 timestamp
602 policy influencing or governing operations on tenant data
604 configuration influencing or governing operations on tenant data
606 settings influencing or governing operations on tenant data
700 technical characteristic of a data provisioning system or a data provisioning method
702 cached data updates are provided or performed on a per-tenant 412 basis
704 cached data updates are provided or performed on a per-category 506 basis
706 cached data updates are provided or performed in response to mechanism or trigger other than expiration of the cached data
708 cached data updates are provided or performed in place rather than evicting other cached data to make room for the updated data
710 updates are performed by transmitting incremental changes, that is, unless a different percentage is specified then the data 502 transmitted is at least 75% changed data when measured using the smallest addressable storage unit, e.g., when 32-bit words are the smallest addressable storage unit then at most 25% of the words of cached data transmitted in a change 428 have the same value as the cached data they will replace
712 updates to cached data flow outward from the central computing environment to one or more remote computing environments but not in the opposite direction; updates may instead enter the central computing environment through an admin portal 420
714 updates are performed proactively, as opposed to being performed as reactions to cache misses
716 avoid an increase in latency that would result from using a conventional approach instead of the data provisioning taught herein
718 avoid an increase in remote nodes serving non-current (relative to the central data store) data that would result from using a conventional approach instead of the data provisioning taught herein
720 meet a specified level of performance, e.g., in avoiding serving non-current data
800 data provisioning flowchart; 800 also refers to data provisioning methods illustrated by or consistent with the FIG. 8 flowchart, and to the act of data provisioning using such a method
802 receive an incremental change
804 place an incremental change in a data store
806 find an incremental change in a data store, e.g., based on one or more of the data entity fields illustrated in FIG. 5
808 compare two timestamps to determine which represents the most recent time or most recent event
810 determine that an incremental change in a data store is more recent than the data entity in a cache
812 apply an incremental change to a copy of the data
814 produce updated data 502 in a cache
816 get (e.g., receive, be given) a request from a tenant or a user for current tenant data
818 a request from a tenant or a user for current tenant data; also refers to the act of requesting such data
820 provide a copy of cached data 502 in response to a request 818
900 flowchart; 900 also refers to data provisioning methods illustrated by or consistent with the FIG. 9 flowchart
902 avoid relying on cache data expiration or cache data eviction to determine when or how to update cached data
904 cache entry expiration
906 cache entry eviction
908 precondition or trigger for updating cached data
910 avoid refreshing the cache data as part of handling a cache miss
912 refresh cache data 502
1000 flowchart; 1000 also refers to data provisioning methods illustrated by or consistent with the FIG. 10 flowchart (which incorporates the steps of FIG. 8 and the steps of FIG. 9)
1002 maintain updated tenant data in remote server caches
1004 avoid increased latency; provide technical characteristic 716
1006 avoid increased provision of non-current data; provide technical characteristic 718
1008 provision of non-current data
1010 reside in a cloud or clouds
1012 be located at a particular location, or be located at a distance from another specified location
1014 avoid sending data entity updates inward from a remote computing environment to the central computing environment
1016 send data entity updates inward
1018 meet a specified performance level
1020 satisfy recentness criteria
1022 define a data category 506 by specifying criteria for membership in the category
1024 select a data category 506, e.g., based on user interface input or a default selection
1026 avoid pulling certain changes to a remote server, e.g., avoid pulling changes not owned by a particular tenant or changes not made to data in a particular data category 1028 ascertain that a change indicates data 502 deletion has been, or should be, performed
1030 data 502 deletion; delete data 502
1032 remove a data entity from a server cache
1034 detect a communication with a server, e.g., from a flag set by the communication or from a communication log
1036 a communication with a server; communicate with a server
1038 avoid sending a data entity update to a remote data store from a remote data server
1040 any step discussed in the present disclosure that has not been assigned some other reference numeral
1042 discern whether tenant satisfies recentness criteria, e.g., discern recently active tenant(s)
1044 tag or mark data or a data entity for deletion Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 10, some embodiments use or provide a functionality-enhanced data provisioning system. As discussed herein, the functionality enhancement promotes lower latency in providing cached data through a remote server and promotes higher consistency between the data that is served from the cache and the most current form of that data, which is in a central data store.

In some embodiments, a remote computing system (components 406 and 414) is configured to receive data entity updates from a central computing environment 202 that has a central data store 404. The remote computing system includes a memory 112 including a cache 418 and memory 112 in a remote data store 406. The remote computing system also includes at least one processor 110 in operable communication with the memory. The processor may include multiple "cores", which are not necessarily on the same circuit board or even within the same device housing. These cores are themselves processors 110 for purposes herein. The processor is configured to perform data provisioning steps, such as those illustrated in FIGS. 4 and 8, which include (a) receiving 802 from the central computing environment 202 a proactively pushed 426 incremental change 428 to a data entity 408 that is owned by a tenant 412, (b) placing 804 the incremental change in the remote data store 406 of the remote computing system, (c) proactively checking 422 the remote data store for tenant data updates, (d) finding 806 the incremental change in the remote data store, (e) determining 810 that the incremental change has not yet been pulled onto a remote server 416 of the remote computing system, (f) pulling 430 the incremental change onto the remote server, (g) applying 812 the incremental change to produce 814 an updated copy of the data entity in the cache, and (h) providing 820 tenant data 502 of the updated copy of the data entity in response to a request 818 to the remote server for current tenant data.

In some embodiments, the remote computing system is configured to maintain 1002 updated tenant data in the cache without 902 requiring an expiration 904 of the cached data entity as a precondition 908 for updating tenant data in the cache, and without 902 requiring eviction 906 of the data entity from the cache as a precondition 908 for updating tenant data in the cache. Either or both preconditions may also be present in other embodiments. Technical effects of the described caching and data provisioning architecture include avoiding increased latency and avoiding increased provision of non-current tenant data.

In some embodiments, as shown in FIG. 5, the data entity 408 includes the tenant data 502, an identification 504 of the data entity, an identification 412 of the tenant which owns the tenant data, and a timestamp 508. In some cases, the data entity 408 includes an identification 506 of the data category to which the data 502 belongs.

In some embodiments, the processor 110 includes multiple cores (which are themselves processors 110). In some, a processor core of the remote data store 406 places 804 the incremental change in the remote data store, and a processor core of the remote server 416 produces 814 an updated copy of the data entity in the cache. The remote data store 406 and the remote server 416 or other remote node 414 may reside together in a single physical device, or they may reside in separate respective physical devices.

In some embodiments, the remote computing system is configured to avoid sending the central computing environment any change to the data entity. That is, the overall distributed computing system 400 that includes the remote computing system and the central computing environment is configured with the outward-only updating technical characteristic 712.

In some embodiments, the remote data store 406 and the remote server 416 each reside in a cloud computing environment 304. Some or all of the components 406, 414, 404, 410 may reside in a cloud or reside in a non-cloud network, in respective embodiments.

In some embodiments, the remote computing system (data store 406 and node(s) 414) is located 1012 at a geographic distance 302 from the central data store 404. In such embodiments, being located at a geographic distance means at least one of the following is present between the remote computing system and the central data store: a physical distance 302 between respective data center facilities 312, a physical distance 302 of at least ten miles, a network distance 302 spanning at least two routers 306, a network distance 302 spanning at least one network address translation 308, a network distance 302 spanning at least a portion of a publicly addressable wide area network 310, or a network distance 302 having a latency 314 of at least thirty seconds.

In some embodiments, operation of the remote computing system in coordination with the central computing environment provisions 1002 the cache 418 such that the tenant data 502 in the cache is identical to tenant data 502 in the central data store 404 for at least 99% of instances in which the remote server 416 provides tenant data from the cache in response to a request to the remote server for current tenant data. This is an example of meeting 1018 a specified performance level.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific component names, optimizations, algorithmic choices, data, data types, configurations, implementations, arrangements, displays, features, technical characteristics, approaches, or scenarios provided herein. A given embodiment may include additional or different technical features, mechanisms, sequences, data structures, or functionalities for instance, and may otherwise depart from the examples provided herein.

Processes (a.k.a. Methods)

Figure 4:
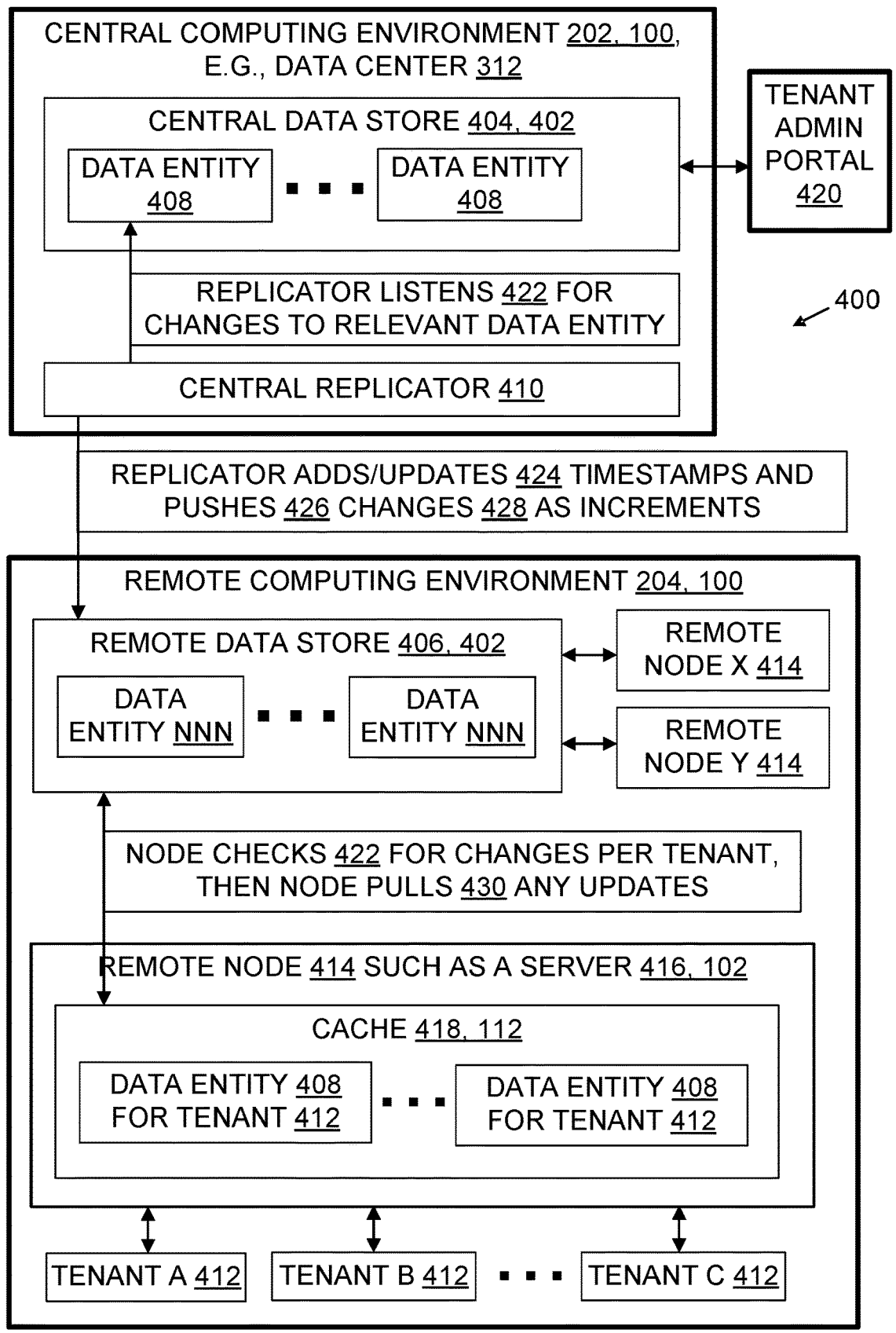
FIG. 4 is a data flow diagram illustrating aspects of a distributed computing system which has a highly responsive data provisioning functionality.

FIGS. 8 and 9 illustrate data provisioning methods which may be performed or assisted by an enhanced system such as part or all of the system illustrated in FIG. 4. FIG. 10 further illustrates data provisioning methods (which may also be referred to as "processes" in the legal sense of that word), including some refinements, supplements, or contextual actions for steps shown in FIGS. 8 and 9. Technical processes shown in the Figures or otherwise disclosed will be performed automatically, e.g., by components 404, 410, 406, 414, unless otherwise indicated. Processes may also be performed in part automatically and in part manually to the extent action by a human administrator or other human person is implicated, e.g., in some embodiments a person may specify how many minutes into the past communication must have occurred within to be considered recent when discerning recently active tenants. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 8, 9, and 10. Steps may be performed serially, in a partially overlapping manner, or fully in parallel. In particular, the order in which flowchart 800 action items or flowchart 900 action items or flowchart 1000 are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a highly responsive data provisioning method for maintaining cache content in a distributed computing system 400 which includes a central computing environment having a central data store and also includes at least one remote computing environment located at a distance from the central computing environment. This method includes a remote data store in the remote computing environment receiving 802 an incremental change to a data entity that is owned by a tenant. The incremental change was pushed 426 proactively to the remote data store from the central computing environment. This method also includes a remote server in the remote computing environment proactively checking 422 the remote data store, determining 810 that the incremental change has not yet been pulled onto the remote server, pulling 430 the incremental change onto the remote server, and applying 812 the incremental change to produce 814 an updated copy of the data entity in a cache of the remote server. This example method maintains 1002 updated data in the cache on a per-tenant basis 702 without requiring 706 an expiration of the cached data entity as a precondition for updating data of the data entity in the cache, and without requiring 708 eviction of the data entity from the cache as a precondition for updating data of the data entity in the cache.

Some embodiments further include discerning 1042 all tenants whose interaction with the remote server satisfies 1020 a predetermined criterion for being recently active. For each recently active tenant, the embodiment checks 422 the remote data store for an incremental change to a data entity owned by that recently active tenant, while avoiding 1026 pulling onto the remote server any incremental change to any data entity that is not owned by some recently active tenant. For example, the embodiment may be configured to only pull changes to policy 602 data 502 for tenants active within the past 12 hours, or the embodiment may be configured to only pull changes for tenants who used a FooBarExtreme SaaS application within the past thirty minutes.

More generally, some embodiments select 1024 one or more data categories 506 to specify the data changes to pull and apply. Each data category is defined 1022 in terms of one or more of the following: a policy 602 of a tenant 412, an application 124 used by a tenant 412, a configuration 604 of a tenant (e.g., which OS, which OS version, whether the antivirus tool is up to date, etc.), or a setting 606 of a tenant (e.g., whether automatic updates are enabled, and at what frequency). Some embodiments then check 422 the remote data store for any incremental change to a data entity belonging to at least one selected data category, and avoid 1026 pulling onto the remote server any incremental change to any data entity that does not belong to at least one selected data category.

Some embodiments discern 1042 all tenants whose interaction with the remote server satisfies a predetermined criterion for being recently active, select 1024 one or more data categories, check 422 the remote data store for any incremental change to a data entity of a recently active tenant belonging to at least one selected data category, and pull the pertinent changes while avoiding pulling onto the remote server any incremental change to any data entity that does not belong to at least one selected data category and to a recently active tenant.

Some embodiments ascertain 1028 that the incremental change indicates deletion 1030 of the data entity, and then remove 1032 the data entity from the remote server cache in response to the ascertaining.

In some embodiments, performance of the method provisions 1002 the remote server cache such that the tenant data in the remote server cache is identical to tenant data in the central data store for at least 95% of instances in which the remote server provides tenant data from the remote server cache in response to a request to the remote server for current tenant data.

In some embodiments, any update to tenant data in the remote server cache is made only in response to finding a corresponding incremental change in the remote data store. In particular, users do not submit data 502 changes to the remote server 416.

In some embodiments, the remote server proactively checks 422 the remote data store at an interval which is less than one minute. Other embodiments may use different intervals, e.g., 30 seconds, 10 seconds, or two minutes, or five minutes.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as data entities 408, caches 418 (which are understood to include hardware or software operating as described herein), and data provisioning software which performs methods 800, 900, or 1000, in the form of data 118 and instructions 116, read from a removable storage medium 114 and/or another source such as a network connection, to form a configured storage medium. The configured storage medium 112 is capable of causing a distributed computer system such as the one in FIG. 4 to perform technical process steps for data provisioning with one or more of the technical characteristics 700, as disclosed herein. The Figures thus help illustrate configured storage media embodiments and process (a.k.a. method) embodiments, as well as system and process embodiments. In particular, any of the process steps illustrated in FIG. 8 or 9 or 10, or otherwise taught herein, may be used to help configure a storage medium to form a configured storage medium embodiment.

Some embodiments use or provide a computer-readable storage medium 112, 114 configured with data 118 and instructions 116 which upon execution by a processor 110 cause a server to perform a highly responsive data provisioning method. This method includes proactively and periodically checking 422 a data store for incremental changes to data entities. Upon finding 806 an incremental change that has not yet been pulled onto the server, execution according to this method pulls 430 the incremental change onto the server, and applies 812 the incremental change to produce 814 an updated copy of the data entity in a cache of the server, e.g., by changing the cached 418 value to match the pulled value or by marking the cached value for deletion.

In this embodiment, cache refresh is accomplished without requiring 902 an expiration 904 of the cached 418 data entity as a precondition for updating data 502 of the data entity in the cache 418, and without requiring 902 eviction 906 of the data entity from the cache as a precondition for updating data 502 of the data entity in the cache. Execution according to this method then provides 820 tenant data 502 of the updated copy of the data entity in response to a request to the server for current tenant data, without 910 getting the current tenant data from the data store in response to the request or getting the current tenant data from another computing environment in response to the request. These are examples of the eviction unnecessary technical characteristic 708, the expiration unnecessary technical characteristic 706, and the proactive update technical characteristic 714.

In some embodiments, any update to tenant data in the server cache is made only in response to finding a corresponding incremental change in the data store. Thus, the embodiment avoids 1038 direct entry of updates by a tenant to the server's copy of the data 502; data entry is performed instead through a portal 420 connected to the central data store 404, from whence the update is propagated outward until it reaches the server cache. Authentication, validation, and contractual requirements may be imposed along the way, e.g., to restrict use of the portal 420 and protect the integrity of data 502. Similarly, the server or other remote node 414 may be configured to avoid 1038 sending the central data store 404 or the remote data store 406 any change to the data entity. Avoiding such communication with an unspecified data store means avoiding such communication with any central or remote data store. These are examples of the outward-only technical characteristic 712.

In some embodiments, the method includes discerning 1042 all tenants whose interaction with the server satisfies a predetermined criterion for being recently active, selecting 1024 one or more data categories, checking 422 the data store for any incremental change to a data entity of a recently active tenant belonging to at least one selected data category, pulling 430 any matching change, and avoiding 1026 pulling onto the server any incremental change to any data entity that does not belong to at least one selected data category and to a recently active tenant. In some embodiments, the predetermined criterion for being 1020 recently active includes the detection 1034 of a communication 1036 with the server from the tenant or regarding the tenant, which occurred within a period including the most recent N minutes, where N is not greater than one hundred twenty. Other values of N may be used, in different configurations or different embodiments, e.g., sixty, thirty, ten, or five.

Additional Examples and Observations

One of skill will recognize that not every part of this disclosure, or any particular details therein, are necessarily required to satisfy legal criteria such as enablement, written description, or best mode. Also, embodiments are not limited to the particular networks, network protocols, network topologies, identifiers, fields, data structures, functions, constants, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments help an organization maintain caches on remote geographies, updated near real-time, for servers that are expected to provide high responsiveness and low latency for traffic from users. Any product or service that utilizes geo-distributed servers which are meant to have very low latency may benefit from implementing teachings provided herein.

One embodiment of a suitable distributed computing system performs the following steps in operation, with some operations performed by a low latency server 416 and other operations performed that require and by a geographically-remote central data-store 404. On the data-store 404, code 410 listens for changes on relevant data entities 408 and pushes 426 partial changes 428 to smaller data stores 406 near each low latency server 416. Code 410 tags changed entities 408 with a current timestamp 508 during the remote push. On the server 416, a cache 418 includes a data-set containing multiple data entities 408, which belong to specific tenants 412. Only data 502 of tenants that were active recently is maintained in the cache. Server code or remote data store code checks for changes in entities belonging to the specific tenants, using a changed timestamp. The server code updates only changed data-sets by pulling 430 them into the server cache 418, from whence they are provided 820 to users, e.g., tenant employees. As for deleted entities 408, code monitors for deletion in datasets 502 by tagging 1044 deleted entities in a specific flag during the remote push, and updating the "changed" timestamp.

In some embodiments, change detection employs timestamp comparison. Each document 408 is assigned an ID 504 and a timestamp 508 upon entry to the central data store 404. The ID is fixed during the lifetime of the document, whereas the timestamp is updated upon each modification of any data 502 in the document. When remote nodes 414 hold tenant data 502, they track the timestamp of the most recent version of the document they hold, categorized by document types 506.

In this example, at fixed intervals, e.g., every 30 seconds, the remote node 414 asks 422 the remote data store 406 for documents 408 for a given document type 506. This may be done in a round robin manner cycling through document types, in a manner weighted toward particular document types, or with all document types each time the node 414 checks 422 for changes. The check operation looks for any corresponding document whose timestamp is larger the timestamp of the document version that is currently held on the node 414.

Accordingly, in this example documents that were not modified since the previous time they were loaded 414 onto the node 414 will not be returned by the search, as their timestamp value is not larger than the one provided in the search. Those documents are already current in the node 414. Also, documents that do not belong to one of the tenants serviced by this node will not be returned by the search for loading. On the other hand, documents 408 that are related to an active tenant and that have been modified since they were last loaded, will be returned by the search and accordingly will be loaded 430 and cached in the node.

Notice that the timestamp comparison 808 in this example does not require that timestamp values actually represent a date or a time, so far as users 104 are concerned. Indeed, timestamp values could also be referred to as "comparison values". The comparison 808 may simply compare two integer values and determine which is larger. In some embodiments, updating 424 timestamps on every data 502 modification ensures that each update will receive a larger comparison value 508, allowing an embodiment to get a snapshot of all documents 408 as they existed at a particular point in time.

In some embodiments, a user 104 is the same thing as a tenant 412, as far as the embodiment is concerned, since there is no data 502 stored that is specific to a particular end-user; only tenant-level data is stored.

One of skill understands a difference between "expiry" and "refresh". Expiration triggers data eviction from a conventional cache or from some embodiments that lack the technical characteristic 706, e.g., when a tenant is inactive for at least a predetermined period. Refresh implies that a refresh cycle occurs every fixed interval or upon specified trigger events, and involves the logic of checking for data deltas 428 and fetching 430 new data 502 if available. Some embodiments pull the refresh without the need to evict the data. A conventional cache holds data 118 until it expires. Changes in the original data are not reflected in the cache, until the cache entry expires 904. Only consequent for that data will trigger reloading. In contrast, some embodiments attempt to always obtain the newest data available, even before the data's expiration. As a result, such embodiments do not require data eviction 906 in order to refresh cached data.

In some embodiments, data ownership is indicated in the data entity 408, regardless of whether the data entity is in the central data store 404, the remote data store 406, the remote node cache 418, or in outward transit between such components. An identified tenant owns the data 502 that is in the data entity.

In some embodiments, a special timestamp 508 value indicates deletion. In some, deletion is a particular kind of change 428 to be aware of (e.g., propagated, logged, audited, etc.), so the embodiment does not simply remove the entry 408 altogether from the central data store 404. Instead, code adds to the data entity 408 a second, special timestamp that means deleted, while still updating the regular timestamp to mark when the document has been modified (in this case "modified" means "deleted"). So the embodiment sees this document has been changed and therefore loads 430 it, but then the embodiment sees the "deleted" timestamp, understands this data 502 is no longer valid, and removes 1032 this data entity from the cache 418. This may be performed by a background job that sees the data entities with the "deleted" timestamp, and after a fixed interval of time (to allow all nodes 414 to acquire and process the deletion), actually removes 1032 the data entity from the remote area 204.

In some embodiments, a background flow of operations to refresh tenant data 502 on a node 414 runs in the background, e.g., as a background process. When a timer event, interrupt, or other trigger mechanism indicates it is again time to refresh all local tenant data, a refresh strategy operates as follows. The flow gets 1042 all active tenants in a current node 414, and for each tenant 412 and each selected (possibly by default) data type 506 asks whether there is new data 502 on the data store 406 that the current node 414 doesn't hold. If not, the current node 414 continues to use the existing tenant data 502 in the current node's cache 418. But if there is new data 502 on the data store 406 that the current node 414 doesn't hold, then the current node loads 430 it into the current node's cache, subject to the efficiency constraint that only the data of the active tenants and their selected data types 506 is loaded. In some embodiments, only data 502 missing from the cache 418 is loaded 430.

In some embodiments, operations to get tenant data upon a service request 818 proceed as follows. A request 818 for tenant data 502 arrives at a service node 414. The node will use the tenant data to service the request 818. Service code asks whether this node 414 currently holds this tenant's data. If it does not, then up-to-date data 502 of this tenant is fetched 430 by the node 414. If the node 414 already holds this tenant's data, then service code asks whether that data 502 in the node is up-to-date. If the data in the node is not up-to-date, then up-to-date data 502 of this tenant is fetched 430 by the node 414. Finally, the node 414 uses the up-to-date tenant data from the node's cache 418 to service the request 818.

Some embodiments support transferring specific documents 408 using teachings provided herein, in order to get new or modified data 502 to globally distributed regions 204. Some embodiments support transferring specific documents 408 in order to get new data 502 only for customers 412 that are active in given regions 204, thereby reducing or minimizing the amount of data 502 transferred. Some embodiments support transferring specific documents 408 such that each node 414 (endpoint) will only get data that is modified or new, and only for tenants 412 that are active on that node 414. For example, if one hundred documents were modified for one hundred tenants, but each node only serves ten of those tenants, then each node will pull 430 only the data that is modified or new, and only for ten tenants. Each node will ignore the modified or new data for the other ninety tenants that node does not serve. This helps ensure prompt and clean transactions.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

Conclusion

In short, the teachings provided herein may be applied to computing systems in a cloud or elsewhere, and thereby enhance data provisioning functionalities. In some embodiments, distributed computing system 400 functionality is enhanced. Transmission of data changes 428 may be incremental, thus reducing bandwidth usage and latency 314. Data changes 428 may be propagated over geographic distances in an outward-only manner 712 from a central data store 404 to one or more servers 416 or other remote nodes 414, using proactive 714 updates as opposed to making cache updates only in reaction to cache misses. Cache expiration and eviction may be reduced 706, 708 or avoided as mechanisms for determining when cached data 502 is modified. A central computing environment 202 may proactively push incremental data entity changes to place them in remote data stores 406. Remote nodes 414 proactively check 422 their remote data store, find 806 changes, pull 430 respective selected 1026 changes into their remote node caches 418, and provide 820 current data 502 in response to service requests 818. Data 502 may be owned by particular tenants 412. Data pulls 430 may be limited 1026 to data in selected categories 506, data of recently active tenants 412, or both.

Embodiments are understood to also include or benefit from tested and appropriate security controls and privacy controls such as the General Data Protection Regulation (GDPR), e.g., it is understood that appropriate measures should be taken to help prevent misuse of computing systems through the injection or activation of malware and help avoid tampering with any personal or private information the distributed computing system may process during its operations. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8, 9, and 10 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A data provisioning remote computing system which is configured to receive data entity updates from a central computing environment that has a central data store, the remote computing system comprising:
   a memory including a cache;
   a processor in operable communication with the memory, the processor configured to perform steps which include (a) receiving from the central computing environment a proactively pushed incremental change to a data entity, wherein the data entity is owned by a tenant, (b) placing the incremental change in a remote data store of the remote computing system, (c) proactively checking the remote data store for tenant data updates, (d) finding the incremental change in the remote data store, (e) determining that the incremental change has not yet been pulled onto a remote server of the remote computing system, (f) pulling the incremental change onto the remote server, (g) applying the incremental change to produce an updated copy of the data entity in the cache, said updated copy of the data entity in the cache also referred to herein as a cached data entity, and (h) providing updated tenant data of the cached data entity in response to a request to the remote server for current tenant data;
   wherein the remote computing system is configured to maintain the updated tenant data in the cache without requiring an expiration of the cached data entity as a precondition for updating tenant data in the cache, and without requiring eviction of the data entity from the cache as a precondition for updating tenant data in the cache.

2. The computing system of claim 1, wherein the data entity comprises at least a portion of the tenant data, an identification of the data entity, an identification of the tenant which owns the portion of the tenant data, and a timestamp.

3. The computing system of claim 1, wherein the processor comprises multiple cores, a processor core of the remote data store places the incremental change in the remote data store, and a processor core of the remote server produces an updated copy of the data entity in the cache.

4. The computing system of claim 1, wherein the remote computing system is configured to avoid sending the central computing environment any change to the data entity.

5. The computing system of claim 1, wherein the remote data store and the remote server each reside in a cloud computing environment.

6. The computing system of claim 1, wherein the remote computing system is located at a geographic distance from the central data store, and wherein being located at a geographic distance means at least one of the following is present between the remote computing system and the central data store: a physical distance between respective data center facilities, a physical distance of at least ten miles, a network distance spanning at least two routers, a network distance spanning at least one network address translation, a network distance spanning at least a portion of a publicly addressable wide area network, or a network distance having a latency of at least thirty seconds.

7. The computing system of claim 1, wherein operation of the remote computing system in coordination with the central computing environment provisions the cache such that the tenant data in the cache is identical to tenant data in the central data store for at least 99% of instances in which the remote server provides tenant data from the cache in response to a request to the remote server for current tenant data.

8. A highly responsive data provisioning method for maintaining cache content in a distributed computing system which includes a central computing environment having a central data store and also includes at least one remote computing environment located at a distance from the central computing environment, the method comprising:
   a remote data store in the remote computing environment receiving an incremental change to a data entity, wherein the data entity is owned by a tenant, the incremental change having been pushed proactively to the remote data store from the central computing environment;
   a remote server in the remote computing environment proactively checking the remote data store, determining that the incremental change has not yet been pulled onto the remote server, pulling the incremental change onto the remote server, and applying the incremental change to produce an updated copy of the data entity in a cache of the remote server;
   wherein the method maintains updated data in the cache on a per-tenant basis without requiring an expiration of the data entity in the cache as a precondition for updating data of the data entity in the cache, and without requiring eviction of the data entity from the cache as a precondition for updating data of the data entity in the cache.

9. The method of claim 8, further comprising discerning all tenants whose interaction with the remote server satisfies a predetermined criterion for being recently active, and for each recently active tenant checking the remote data store for an incremental change to a data entity owned by that recently active tenant, while avoiding pulling onto the remote server any incremental change to any data entity that is not owned by some recently active tenant.

10. The method of claim 8, further comprising:
selecting one or more data categories, each data category defined in terms of one or more of the following: a policy of a tenant, an application used by a tenant, a configuration of a tenant, or a setting of a tenant;
checking the remote data store for any incremental change to a data entity belonging to at least one selected data category; and
avoiding pulling onto the remote server any incremental change to any data entity that does not belong to at least one selected data category.

11. The method of claim 8, further comprising:
discerning all tenants whose interaction with the remote server satisfies a predetermined criterion for being recently active;
selecting one or more data categories, each data category defined in terms of one or more of the following: a policy of a recently active tenant, an application used by a recently active tenant, a configuration of a recently active tenant, or a setting of a recently active tenant;
checking the remote data store for any incremental change to a data entity of a recently active tenant belonging to at least one selected data category; and
avoiding pulling onto the remote server any incremental change to any data entity that does not belong to at least one selected data category and to a recently active tenant.

12. The method of claim 8, further comprising:
ascertaining that the incremental change indicates deletion of the data entity; and
removing the data entity from the remote server cache in response to the ascertaining.

13. The method of claim 8, wherein performance of the method provisions the remote server cache such that the tenant data in the remote server cache is identical to tenant data in the central data store for at least 95% of instances in which the remote server provides tenant data from the remote server cache in response to a request to the remote server for current tenant data.

14. The method of claim 8, wherein any update to tenant data in the remote server cache is made only in response to finding a corresponding incremental change in the remote data store.

15. The method of claim 8, wherein the remote server proactively checks the remote data store at an interval which is less than one minute.

16. A computer-readable storage medium configured with data and instructions which upon execution by a processor cause a server to perform a highly responsive data provisioning method, the method comprising:
proactively and periodically checking a data store for incremental changes to data entities;
upon finding an incremental change that has not yet been pulled onto the server, pulling the incremental change onto the server;
applying the incremental change to produce an updated copy of a data entity of the data entities, the data entity in a cache of the server without requiring an expiration of the data entity in the cache as a precondition for updating data of the data entity in the cache, and without requiring eviction of the data entity from the cache as a precondition for updating data of the data entity in the cache; and
providing data of the updated copy of the data entity in response to a request to the server for current data, without getting the current data from the data store in response to the request or getting the current data from another computing environment in response to the request.

17. The computer-readable storage medium of claim 16, wherein any update to data in the server cache is made only in response to finding a corresponding incremental change in the data store.

18. The computer-readable storage medium of claim 16, wherein the method further comprises:
discerning all tenants whose interaction with the server satisfies a predetermined criterion for being recently active;
selecting one or more data categories;
checking the data store for any incremental change to a data entity of a recently active tenant belonging to at least one selected data category; and
avoiding pulling onto the server any incremental change to any data entity that does not belong to at least one selected data category and to a recently active tenant.

19. The computer-readable storage medium of claim 18, wherein the predetermined criterion for being recently active includes the detection of a communication with the server from the tenant or regarding the tenant, which occurred within a period including the most recent N minutes, where N is not greater than one hundred twenty.

20. The computer-readable storage medium of claim 16, wherein the server is configured to avoid sending the data store any change to the data entity.

\* \* \* \* \*